(12) United States Patent
Li et al.

(10) Patent No.: US 9,890,245 B2
(45) Date of Patent: Feb. 13, 2018

(54) STEARIC ACID DERIVATIVES AND OLEIC ACID DERIVATIVES OF MULTI-ARM POLYETHYLENE GLYCOL

(71) Applicant: JENKEM TECHNOLOGY CO., LTD. (TIANJIN), Tianjin (CN)

(72) Inventors: Junye Li, Tianjin (CN); Meina Lin, Tianjin (CN); Xiaomeng Chen, Tianjin (CN)

(73) Assignee: JENKEM TECHNOLOGY CO., LTD. (TIANJIN), Tianjin (CN)

( * ) Notice: Subject to any disclaimer, the term of this patent is extended or adjusted under 35 U.S.C. 154(b) by 0 days.

(21) Appl. No.: 15/170,909

(22) Filed: Jun. 1, 2016

(65) Prior Publication Data

US 2016/0272762 A1 Sep. 22, 2016

Related U.S. Application Data

(63) Continuation of application No. PCT/CN2014/092735, filed on Dec. 2, 2014.

(30) Foreign Application Priority Data

Dec. 2, 2013 (CN) ...................... 2013 1 0642675/1

(51) Int. Cl.
*C08G 65/332* (2006.01)
*C08G 65/333* (2006.01)

(52) U.S. Cl.
CPC ....... *C08G 65/3322* (2013.01); *C08G 65/332* (2013.01); *C08G 65/33331* (2013.01); *C08G 65/33334* (2013.01); *C08G 65/33337* (2013.01); *C08G 2650/30* (2013.01); *C08G 2650/32* (2013.01)

(58) Field of Classification Search
None
See application file for complete search history.

(56) References Cited

U.S. PATENT DOCUMENTS

2012/0282671 A1* 11/2012 Zhao ................ A61K 47/48215
435/188

FOREIGN PATENT DOCUMENTS

CN       1511861 A     7/2004
CN     103145968 A     6/2013

OTHER PUBLICATIONS

Chinese (SIPO) Office Action for CN20141071746.9 (related application), dated May 5, 2016, (Eng. tranlsation only).

* cited by examiner

*Primary Examiner* — Alicia L Otton
*Assistant Examiner* — Po-Chih Chen
(74) *Attorney, Agent, or Firm* — Zareefa B. Flener; Flener IP & Business Law

(57) ABSTRACT

Disclosed are multi-arm polyethylene glycol derivatives having structure of formula I or formula VI. Compared with straight chain polyethylene glycol, multi-arm polyethylene glycol has a plurality of terminal groups, thus has a plurality of introducing points of functional groups and can support a plurality of reactive terminal groups, thereby enabling multi-arm polyethylene glycol to have more flexibility and wider range of application.

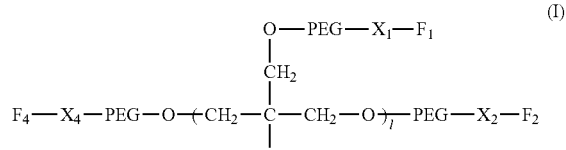

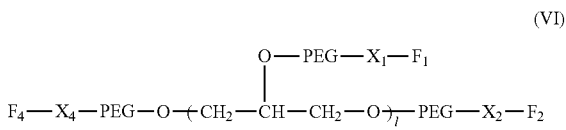

16 Claims, No Drawings

STEARIC ACID DERIVATIVES AND OLEIC ACID DERIVATIVES OF MULTI-ARM POLYETHYLENE GLYCOL

CROSS-REFERENCE TO RELATED APPLICATION

The application is a continuation of PCT/CN2014/092735 (filed on Dec. 2, 2014), which claims priority from CN Patent Application Serial No. 201310642675.1 (filed on Dec. 2, 2013), the entire contents of which are incorporated herein by reference for all purposes.

FIELD OF THE INVENTION

The present invention is related to a multi-arm polyethylene glycol derivative, particularly a multi-arm polyethylene glycol derivative with different reactive groups, stearic acid active derivative, oleic acid active derivative and a preparation method thereof.

BACKGROUND OF THE INVENTION

Currently, polyethylene glycol derivatives are widely used to be combined with proteins, polypeptides, and other therapeutic drugs to prolong the physiological half life of the drugs and reduce immunogenicity and toxicity thereof. In clinical application, PEG and derivatives thereof have been widely used in many drugs as carriers for the production of pharmaceutical preparations, while the study of bonding of PEG with drug molecules has also been developed rapidly in the last decade, polyethylene glycol has a quite clear metabolic processes in the human body, and is a safe synthetic polymer material with no side effects.

As a safe synthetic polymer material with no side effects, polyethylene glycol has been widely used in production of new medical devices. Such as CoSeal from Baxter, SprayGel and DuraSeal from Covidien, are all new medical devices appear on the United States or European market in recent years, using a multi-arm polyethylene glycol.

In the modification of drugs, compared with straight-chain polyethylene glycol, multi-arm polyethylene glycol has a plurality of terminal groups, thus has an advantage of having a plurality of drug connecting points and loading a plurality of drug molecules. At present, multi-arm polyethylene glycol has been widely used in PEGylation modification of polypeptides and small molecule drugs. In the medical device applications, multi-arm polyethylene glycol can be used as a crosslinking agent, applied in production of a gel. These gels can be used as a binder, anti-leakage agent, anti-blocking agent and hemostatic material in medical devices.

Patent WO2011075953A1 discloses a new multi-arm polyethylene glycol having different types of reactive groups, formed by polymerizing ethylene oxide with oligo-pentaerythritol as an initiator, the reactive terminal group thereof is selected from: hydroxyl, amino, sulfydryl, carboxyl, ester group, aldehyde group, acrylic group and maleimide group, which are all short-chain substituents.

CN101747192B discloses a method for synthesizing a polyethylene glycol oleate, obtained by esterification reaction of polyethylene glycol (PEG) with oleic acid used as raw materials under the action of an organic acid catalyst, however, polyethylene glycol polymers prepared by this method have a low polymerization degree and a molecular weight of 400-1,000, and only monooleate or dioleate can be obtained by this method.

CN103145968A discloses a folate-conjugated polyethylene glycol monostearate and preparation method and application thereof, it can be seen from its molecular structure that the product obtained is only a monostearate, and due to the limitation of the linking group, this patent only discloses that polyethylene glycol monostearate can be conjugated with the drug folic acid.

To overcome the deficiencies in the prior art, the present application provides a stearic acid derivative and oleic acid derivative of multi-arm polyethylene glycol and preparation method thereof.

SUMMARY OF THE INVENTION

It is an object of the present invention to provide a stearic acid derivative and oleic acid derivative of multi-arm polyethylene glycol and preparation method thereof to solve the problem of failing to introduce a plurality of functional groups due to the insufficient reactive terminal groups of straight-chain polyethylene glycol.

Another object of the present invention is to overcome the defect in insufficient loading of stearic acid and oleic acid in stearic acid derivatives and oleic acid derivatives of polyethylene glycol.

Another object of the present invention is to enable stearic acid derivatives and oleic acid derivatives of multi-arm polyethylene glycol to be simultaneously loaded with other different reactive terminal groups to solve the problem of an insufficient flexibility and narrow application range of stearic acid derivatives and oleic acid derivatives of polyethylene glycol.

One aspect of the present invention is to provide a multi-arm polyethylene glycol derivative, the multi-arm polyethylene glycol derivative has a structure of general formula I:

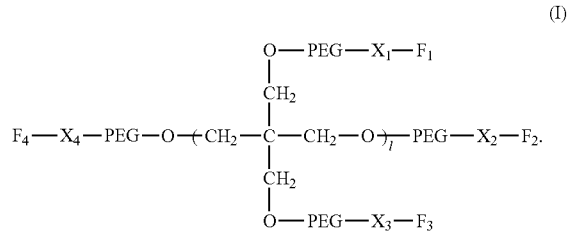

Another aspect of the present invention is to provide a multi-arm polyethylene glycol derivative, the multi-arm polyethylene glycol derivative has a structure of general formula VI:

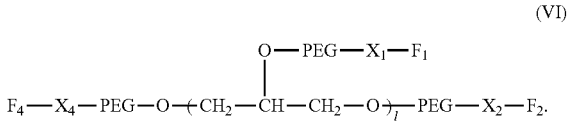

In general formula I or VI of multi-arm polyethylene glycol derivatives described in the present invention: PEG is the same or different and is $-(CH_2CH_2O)_m-$, the average value of m is an integer of 3-250; l is an integer greater than or equal to 1; $X_1$, $X_2$, $X_3$, $X_4$ are linking groups independently selected from the group consisting of the following groups:

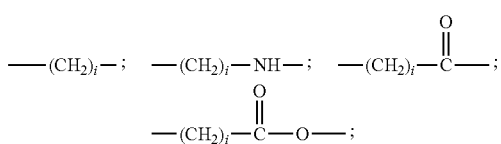

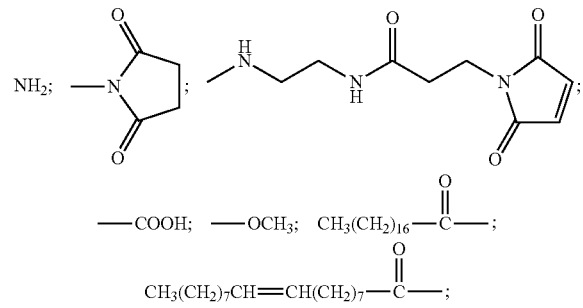

wherein i is an integer of 0-10; $F_1$, $F_2$, $F_3$, $F_4$ are terminal groups, may be the same or different, and independently selected from the group consisting of the following groups:

and, in general formula I at least one of $F_1$, $F_2$, $F_3$, $F_4$ is

or in general formula VI at least one of $F_1$, $F_2$, $F_4$ is

In general formula I or VI of multi-arm polyethylene glycol derivatives described in the present invention, the average value of m is preferably an integer of 68-250, more preferably an integer of 68-227.

In general formula I or VI of multi-arm polyethylene glycol derivatives described in the present invention, l is preferably an integer greater than or equal to 1 and less than or equal to 10, more preferably an integer greater than or equal to 1 and less than or equal to 6, particularly preferably an integer greater than or equal to 1 and less than or equal to 4, and in a particular embodiment of the present invention, l may preferably be 1, 2, 3, 4, 5 or 6.

In general formula I or VI of multi-arm polyethylene glycol derivatives described in the present invention, i in the said groups $X_1$, $X_2$, $X_3$, $X_4$ are independently preferably an integer of 1-5, more preferably an integer of 1-3, and in a particular embodiment of the present invention, i is 1, 2, 3, 4 or 5.

In general formula I or VI of multi-arm polyethylene glycol derivatives described in the present invention, the said $X_2$ and/or $X_4$ are preferably

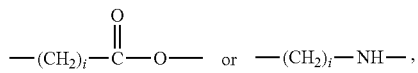

wherein i is an integer of 1-5, preferably an integer of 1-3, and in a particular embodiment of the present invention, the said i is 1, 2 or 3.

In general formula I or VI of multi-arm polyethylene glycol derivatives described in the present invention, the said $X_1$ and/or $X_3$ are preferably —$(CH_2)_i$—NH—, wherein i is an integer of 1-5, preferably an integer of 1-3, and in a particular embodiment of the present invention, the said i is 1, 2, 3.

In general formula I of multi-arm polyethylene glycol derivatives described in the present invention, at least two of the said $F_1$, $F_2$, $F_3$, $F_4$ may be

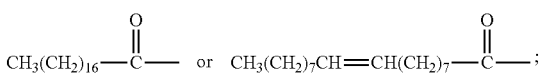

in another embodiment of the present invention, at least three of the said $F_1$, $F_2$, $F_3$, $F_4$ may be

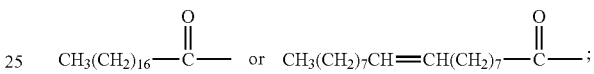

in another embodiment of the present invention, $F_1$, $F_2$, $F_3$, $F_4$ are all

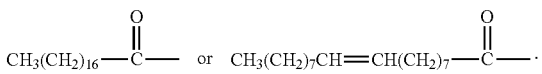

In general formula VI of multi-arm polyethylene glycol derivatives described in the present invention, at least two of the said $F_1$, $F_2$, $F_4$ may be

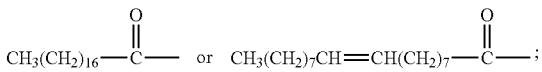

in another embodiment of the present invention, $F_1$, $F_2$, $F_4$ are

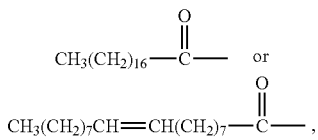

In general formula I or VI of multi-arm polyethylene glycol derivatives described in the present invention, $F_2$ and/or $F_4$ are preferably —COOH or

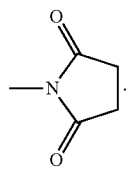

In general formula I of multi-arm polyethylene glycol derivatives described in the present invention, at least one of $F_1$ and $F_3$ is preferably

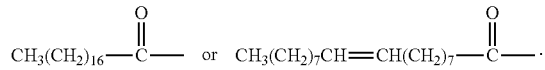

In general formula I of multi-arm polyethylene glycol derivatives described in the present invention, both $F_1$ and $F_3$ are preferably

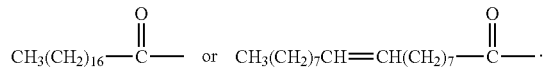

In general formula VI of multi-arm polyethylene glycol derivatives described in the present invention, $F_1$ is preferably selected from

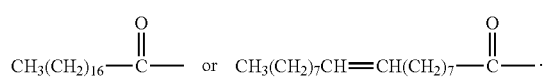

In general formula I of multi-arm polyethylene glycol derivatives described in the present invention, the said $F_1$ and $F_3$ are

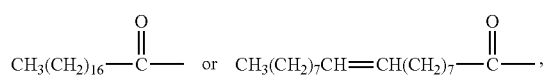

$F_2$ and/or $F_4$ are selected from —COOH and

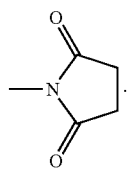

In general formula VI of multi-arm polyethylene glycol derivatives described in the present invention, the said $F_1$ is

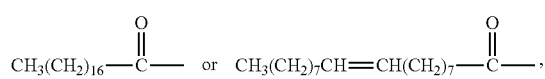

$F_2$ and/or $F_4$ are selected from —COOH and

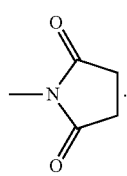

In general formula I of multi-arm polyethylene glycol derivatives described in the present invention, the said $F_1$, $F_2$ and $F_3$ are

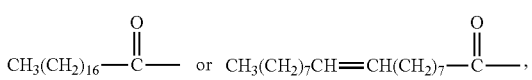

$F_4$ is selected from —COOH and

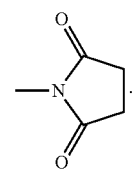

In general formula VI of multi-arm polyethylene glycol derivatives described in the present invention, the said $F_1$ and $F_2$ are

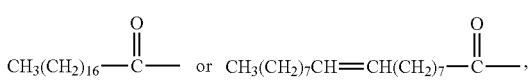

$F_4$ is selected from —COOH and

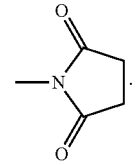

In a particular embodiment of the present invention, the molecular weight of the said multi-arm polyethylene glycol is 1,000-80,000 Da, in a preferred embodiment of the present invention, the molecular weight of the said multi-arm polyethylene glycol is 3,000-20,000 Da, in a more preferred embodiment of the present invention, the molecular weight of the said multi-arm polyethylene glycol is 3,000-10,000 Da, in a most preferred embodiment of the present invention, the molecular weight of the said multi-arm polyethylene glycol may be 3,000 Da, 10,000 Da, 20,000 Da.

In a particular embodiment, the said active derivative of multi-arm polyethylene glycol is a stearic acid-monoacetic acid NHS ester active derivative of multi-arm polyethylene glycol having a structure of general formula II:

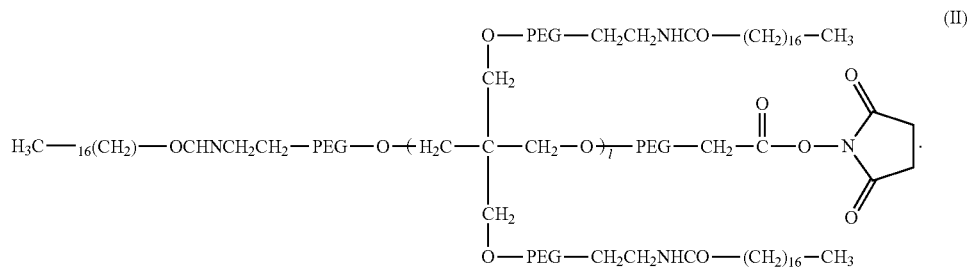

(II)

In a particular embodiment, the said active derivative of multi-arm polyethylene glycol is a stearic acid-diacetic acid NHS ester active derivative of multi-arm polyethylene glycol having a structure of general formula III:

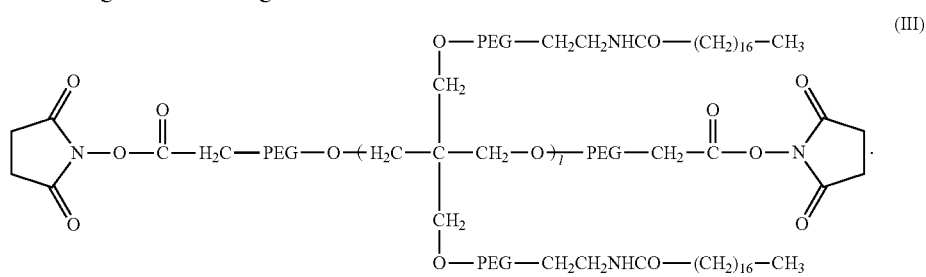

(III)

In a particular embodiment, the said active derivative of multi-arm polyethylene glycol is an oleic acid-monoacetic acid NHS ester active derivative of multi-arm polyethylene glycol having a structure of general formula IV:

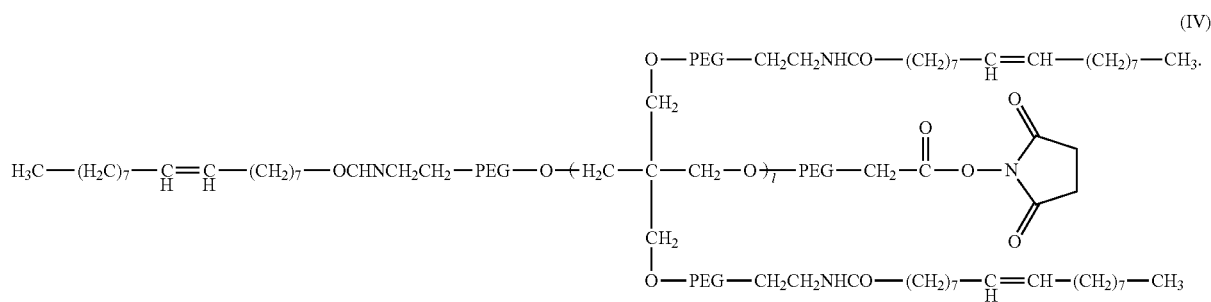

(IV)

In a particular embodiment, the said active derivative of multi-arm polyethylene glycol is an oleic acid-diacetic acid NHS ester active derivative of multi-arm polyethylene glycol having a structure of general formula V:

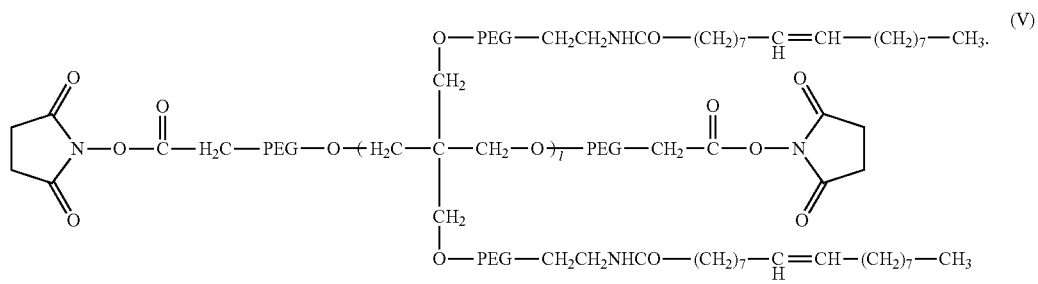

(V)

In a particular embodiment, the said active derivative of multi-arm polyethylene glycol is a stearic acid-monoacetic acid NHS ester active derivative of multi-arm polyethylene glycol having a structure of general formula VII:

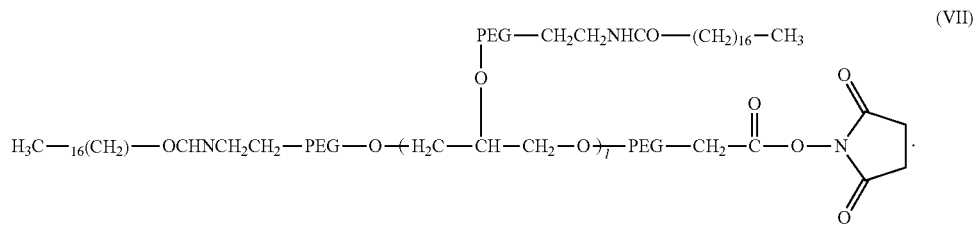

(VII)

In a particular embodiment, the said active derivative of multi-arm polyethylene glycol is a stearic acid-diacetic acid NHS ester active derivative of multi-arm polyethylene glycol having a structure of general formula VIII:

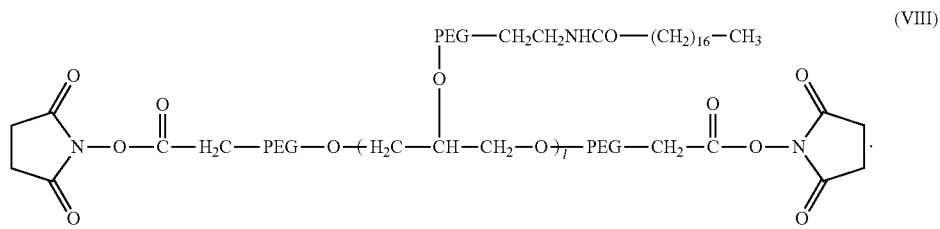

(VIII)

In a particular embodiment, the said active derivative of multi-arm polyethylene glycol is an oleic acid-monoacetic acid NHS ester active derivative of multi-arm polyethylene glycol having a structure of general formula IX:

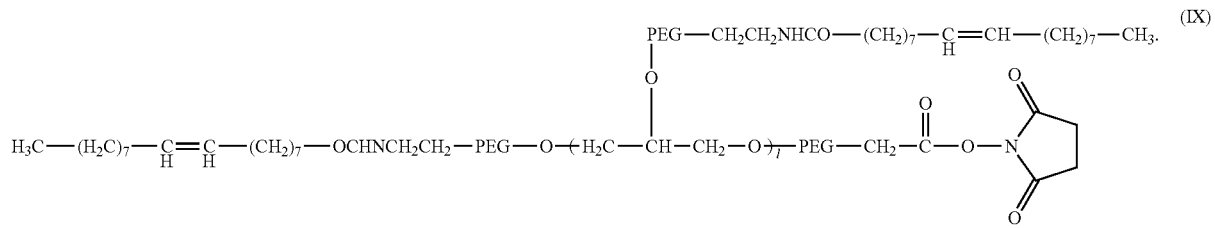

(IX)

In a particular embodiment, the said active derivative of multi-arm polyethylene glycol is an oleic acid-diacetic acid NHS ester active derivative of multi-arm polyethylene glycol having a structure of general formula X:

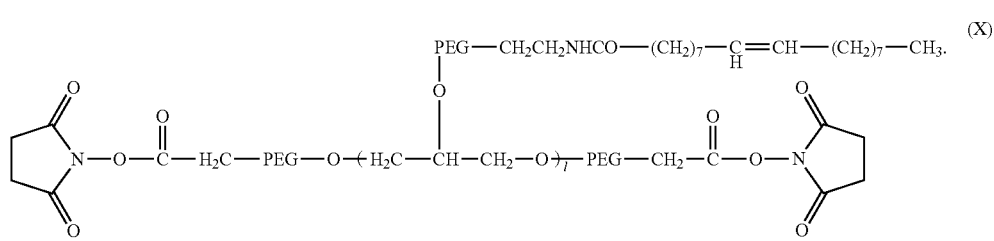

(X)

Another aspect of the invention is to provide a method for preparation of a multi-arm polyethylene glycol derivative of general formula T or formula VI comprising the following steps:

(1) dissolving a multi-arm polyethylene glycol amino-monoacetic acid or multi-arm polyethylene glycol amino-diacetic acid in a solvent, adding thionyl chloride and reacting for 1-10 h to give a multi-arm polyethylene glycol amino-monoacetic acid methyl ester or multi-arm polyethylene glycol amino-diacetic acid methyl ester;

(2) dissolving multi-arm polyethylene glycol amino-monoacetic acid methyl ester or multi-arm polyethylene glycol amino-diacetic acid methyl ester in a solvent, adding stearic acid and triethylamine for reaction to give a multi-arm polyethylene glycol stearic acid-monoacetic acid methyl ester or multi-arm polyethylene glycol stearic acid-diacetic acid methyl ester;

(3) to multi-arm polyethylene glycol stearic acid-monoacetic acid methyl ester or multi-arm polyethylene glycol stearic acid-diacetic acid methyl ester, adding NaOH to adjust the pH value to 10-12, reacting for 1-8 h, filtering, adjusting pH value to 2-3 with hydrochloric acid, extracting, separating to obtain a multi-arm polyethylene glycol stearic acid-monoacetic acid or multi-arm polyethylene glycol stearic acid-diacetic acid;

optionally, (4) dissolving multi-arm polyethylene glycol stearic acid-monoacetic acid or multi-arm polyethylene glycol stearic acid-diacetic acid in a solvent, adding N-hydroxysuccinimide (NHS) and N, N'-dicyclohexylcarbodiimide for reaction to give a multi-arm polyethylene glycol stearic acid-monoacetic acid NHS ester or multi-arm polyethylene glycol stearic acid-diacetic acid NHS ester.

Another aspect of the invention is to provide a method for preparation of a multi-arm polyethylene glycol derivative of general formula I or formula VI comprising the following steps:

(1) dissolving a multi-arm polyethylene glycol amino-monoacetic acid or multi-arm polyethylene glycol amino-diacetic acid in a solvent, adding thionyl chloride and reacting for 1-10 h to give a multi-arm polyethylene glycol amino-monoacetic acid methyl ester or multi-arm polyethylene glycol amino-diacetic acid methyl ester;

(2) dissolving multi-arm polyethylene glycol amino-monoacetic acid methyl ester or multi-arm polyethylene glycol amino-diacetic acid methyl ester in a solvent, adding oleoyl chloride and triethylamine for reaction to give a multi-arm polyethylene glycol oleic acid-monoacetic acid methyl ester or multi-arm polyethylene glycol oleic acid-diacetic acid methyl ester.

(3) to multi-arm polyethylene glycol oleic acid-monoacetic acid methyl ester or multi-arm polyethylene glycol oleic acid-diacetic acid methyl ester, adding NaOH to adjust the pH value to 10-12, reacting for 1-8 h, filtering, adjusting pH value to 2-3 by using hydrochloric acid, extracting, separating to obtain a multi-arm polyethylene glycol oleic acid-monoacetic acid or multi-arm polyethylene glycol oleic acid-diacetic acid.

Optionally, (4) dissolving multi-arm polyethylene glycol oleic acid-monoacetic acid or multi-arm polyethylene glycol oleic acid-diacetic acid in a solvent, adding N-hydroxysuccinimide (NHS) and N, N'-dicyclohexylcarbodiimide for reaction to give a multi-arm polyethylene glycol oleic acid-monoacetic acid NHS ester or multi-arm polyethylene glycol oleic acid-diacetic acid NHS ester.

In the method for preparation of a multi-arm polyethylene glycol derivative of general formula I or formula VI described in the present invention, the reactant multi-arm polyethylene glycol amino-monoacetic acid or multi-arm polyethylene glycol amino-diacetic acid can be commercially obtained, or prepared by the method described in Patent CN102108119A.

In the method for preparation of a multi-arm polyethylene glycol derivative of general formula I or formula VI described in the present invention, the said solvent may be a suitable solvent well known in the art, selected from methanol, ethanol, chloroform, dichloromethane, acetone, diethyl ether, ethyl acetate, and the like.

The stearic acid derivatives and oleic acid derivatives of multi-arm polyethylene glycol described in the present invention can be used to be combined with proteins, peptides, active small molecule drugs, to improve targeting and drug efficacy and reduce toxicity. The said proteins, peptides, active small molecule drugs include, but are not limited to: analgesics and antiphlogistics, antacids, anthelmintics, antiarrhythmic agents, antimicrobials, anticoagulation (blood) agents, antidepressants, antidiabetic agents, antidiarrheals, antiepileptics, antifungal agents, antigout drugs, antihypertensives, antimalarials, antimigraines, muscarine antagonists, antitumor agents and immunosuppressive agents, antiprotozoals, antirheumatics, antithyroid agents, antivirotics, anxiolytics, calmatives, ophthalmic drugs and ataractics, β-receptor blocking agents, cardiac contractile agents, corticosteroids, antitussives, cytotoxic agents, decongestants, diuretics, enzymes, antiparkinsonian drugs, gastrointestinal agents, histamine receptor antagonists, lipid regulating agents, local anesthetics, neuromuscular blocking agents, nitric acid esters and antianginals, nutritional agents, opioid analgesics, oral vaccines, proteins, peptides and recombinant drugs, sex hormones and contraceptives, spermatocides, and irritants. The stearic acid derivatives and oleic acid derivatives of multi-arm polyethylene glycol described in the present invention can be combined with proteins, peptides, active small molecule drugs through combination of the terminal groups thereof with drug molecules as described in Patent CN102108119A, preferably through combination of —COOH or

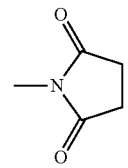

with proteins, peptides, active small molecule drugs.

The stearic acid derivatives and oleic acid derivatives of multi-arm polyethylene glycol described in the present invention have at least one stearic or oleic acid group, and thus can be used for preparation of liposomes, polymer nanoparticles, solid lipid nanoparticles and other nano-drug carriers, to improve drug efficacy and reduce toxicity. Compared with straight-chain polyethylene glycol, multi-arm polyethylene glycol has a plurality of terminal groups, thus has a plurality of introducing points of functional groups and can support a plurality of reactive terminal groups, thereby enabling multi-arm polyethylene glycol to have a more flexibility and wider range of application.

DETAILED DESCRIPTION OF THE INVENTION 4-arm polyethylene glycol amino-monoacetic acid, 4-arm polyethylene glycol amino-diacetic acid used in examples are provided by Beijing JenKem Technology Co., Ltd., other reagents used in the following examples are purchased from Beijing Chemical Reagent Company or other similar public chemical sales companies.

Example 1: Synthesis of 4-Arm Polyethylene Glycol (3,000 Da) Stearic Acid-Monoacetic Acid

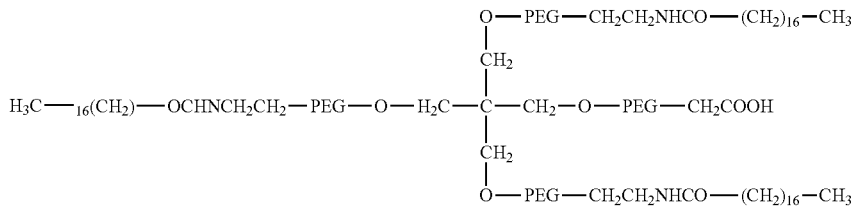

10 g of 4-arm polyethylene glycol (3,000 Da) amino-monoacetic acid was dissolved in 100 mL of anhydrous methanol, placed in an ice-water bath, then 1 mL of thionyl chloride was added dropwise, the reaction was kept for 5 h at room temperature, evaporated by rotary to remove solvent, the residue was frozen for precipitation after addition of 150 mL of diethyl ether, filtered, the product was dried under vacuum to give 8.5 g of 4-arm polyethylene glycol (3,000 Da) amino-monoacetic acid methyl ester.

$^1$H NMR (DMSO): 3.51 (m, 272H), 2.95 (m, 6H), 4.13 (s, 2H).

4.91 g of 4-arm polyethylene glycol (3,000 Da) amino-monoacetic acid methyl ester was dissolved in 100 mL of chloroform, then 0.89 mL of triethylamine and 6.98 g of stearic acid were added, the reaction was stirred overnight at room temperature, filtered, evaporated by rotary to remove solvent, the residue was dissolved by heating after addition of 80 mL of isopropanol and then frozen for precipitation, filtered, evaporated by rotary to remove solvent, the residue was frozen for precipitation after addition of 80 mL of diethyl ether, filtered, the product was dried under vacuum to give 5.0 g of 4-arm polyethylene glycol (3,000 Da) stearic acid-monoacetic acid methyl ester.

$^1$H NMR (DMSO): 0.82-0.87 (t, 9H), 3.51 (m, 272H), 4.13 (s, 2H), 7.82 (m, 3H).

To 5.0 g of 4-arm polyethylene glycol (3,000 Da) stearic acid-monoacetic acid methyl ester, 50 mL of deionized water was added, then the pH value of the system was adjusted to 12 with 0.5 mol/L of NaOH, the reaction was kept for 2 h at room temperature, filtered, then the pH value was adjusted to 2-3 with 1 mol/L of hydrochloric acid, 15% NaCl was added, the reactive liquid was extracted three times with 100 mL of dichloromethane, and the organic phases were combined, washed twice with 100 mL of saturated saline water with a pH value of 2-3, dried with anhydrous sodium sulfate, filtered, the filtrate was evaporated by rotary to remove solvent, the residue was frozen for precipitation after addition of 100 mL of diethyl ether, filtered, the product was dried under vacuum to give 2.5 g of 4-arm polyethylene glycol (3,000 Da) stearic acid-monoacetic acid.

$^1$H NMR (DMSO): 0.82-0.87 (t, 9H), 3.51 (m, 272H), 4.08 (s, 2H), 7.77 (m, 3H).

Example 2: Synthesis of 4-Arm Polyethylene Glycol (3,000 Da) Stearic Acid-Monoacetic Acid Active NHS Ester

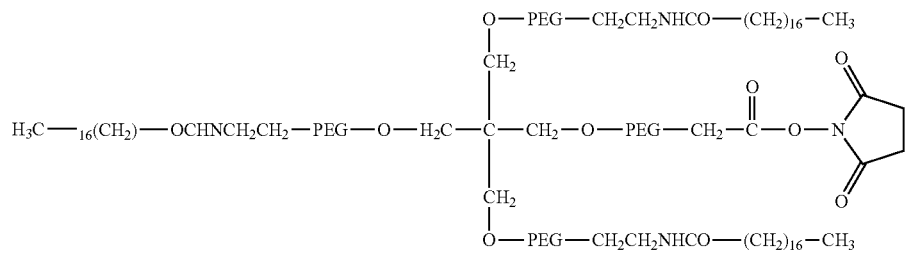

3.0 g of 4-arm polyethylene glycol (3,000 Da) stearic acid-monoacetic acid was dissolved in 30 mL of dichloromethane, then 0.15 g of N-hydroxysuccinimide (NHS) and 0.29 g of N, N'-dicyclohexylcarbodiimide (DCC) were added, the reaction was stirred overnight at room temperature, filtered, evaporated by rotary to remove solvent, the residue was dissolved by heating after addition of 60 mL of isopropanol and then frozen for precipitation, filtered, the product was dried under vacuum to give 2.0 g of 4-arm polyethylene glycol (3,000 Da) stearic acid-monoacetic acid active NHS ester.

$^1$H NMR (DMSO): 0.82-0.87 (t, 9H), 2.81 (s, 4H), 3.51 (m, 272H), 4.60 (s, 2H), 7.77 (m, 3H).

Example 3: Synthesis of 8-Arm Polyethylene Glycol (20,000 Da) Stearic Acid-Monoacetic Acid

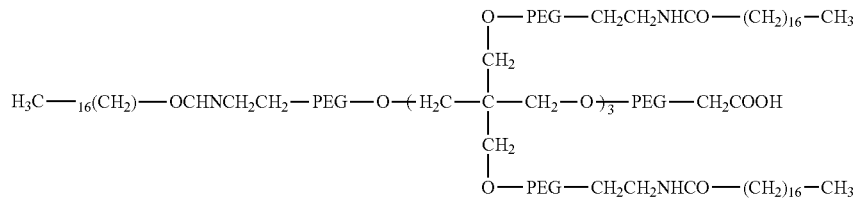

10 g of 8-arm polyethylene glycol (20,000 Da) amino-monoacetic acid was dissolved in 100 mL of anhydrous methanol, placed in an ice-water bath, then 0.3 mL of thionyl chloride was added dropwise, the reaction was kept for 5 h at room temperature, evaporated by rotary to remove solvent, the residue was frozen for precipitation after addition of 150 mL of diethyl ether, filtered, the product was dried under vacuum to give 9.8 g of 8-arm polyethylene glycol (20,000 Da) amino-monoacetic acid methyl ester.

$^1$H NMR (DMSO): 3.51 (m, 1818H), 2.95 (m, 14H), 4.13 (s, 2H).

5 g of 8-arm polyethylene glycol (20,000 Da) amino-monoacetic acid methyl ester was dissolved in 100 mL of chloroform, then 0.27 mL of triethylamine and 2.1 g of stearic acid were added, the reaction was stirred overnight at room temperature, filtered, evaporated by rotary to remove solvent, the residue obtained was dissolved by heating after addition of 80 mL of isopropanol and then frozen for precipitation, filtered, evaporated by rotary to remove solvent, the residue obtained was frozen for precipitation after addition of 80 mL of diethyl ether, filtered, the product was dried under vacuum to give 4.8 g of 8-arm polyethylene glycol (20,000 Da) stearic acid-monoacetic acid methyl ester.

$^1$H NMR (DMSO): 0.82-0.87 (t, 21H), 3.51 (m, 1818H), 4.13 (s, 2H), 7.82 (m, 7H).

To 4.0 g of 8-arm polyethylene glycol (20,000 Da) stearic acid-monoacetic acid methyl ester, then 40 mL of deionized water was added, the pH value of the system was adjusted to 12 with 0.5 mol/L of NaOH, the reaction was kept for 2 h at room temperature, filtered, the pH value was adjusted to 2-3 with 1 mol/L of hydrochloric acid, 15% NaCl was added, the reactive liquid was extracted three times with 80 mL of dichloromethane, and the organic phases were combined, washed twice with 80 mL of saturated saline water with a pH value of 2-3, dried with anhydrous sodium sulfate, filtered, the filtrate was evaporated by rotary to remove solvent, the residue was frozen for precipitation after addition of 80 mL of diethyl ether, filtered, the product was dried under vacuum to give 2.5 g of 8-arm polyethylene glycol (20,000 Da) stearic acid-monoacetic acid $^1$H NMR (DMSO): 0.82-0.87 (t, 21H), 3.51 (m, 1818H), 4.08 (s, 2H), 7.77 (m, 7H).

Example 4: Synthesis of 8-Arm Polyethylene Glycol (20,000 Da) Stearic Acid-Monoacetic Acid Active NHS Ester

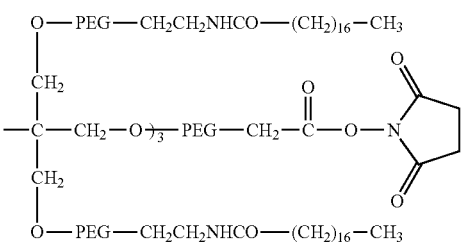

3.0 g of 4-arm polyethylene glycol (3,000 Da) stearic acid-monoacetic acid was dissolved in 30 mL of dichloromethane, then 0.15 g of N-hydroxysuccinimide (NHS) and 0.29 g of N, N'-dicyclohexylcarbodiimide (DCC) were added, the reaction was stirred overnight at room temperature, filtered, evaporated by rotary to remove solvent, the residue dissolved by heating after addition of 60 mL of isopropanol and then frozen for precipitation, filtered, the product was dried under vacuum to give 2.0 g of 4-arm polyethylene glycol (3,000 Da) stearic acid-monoacetic acid active NHS ester.

$^1$H NMR (DMSO): 0.82-0.87 (t, 27H), 2.81 (s, 4H), 3.51 (m, 1818H), 4.60 (s, 2H), 7.77 (m, 7H).

Example 5: Synthesis of 4-Arm Polyethylene Glycol (3,000 Da) Stearic Acid-Diacetic Acid

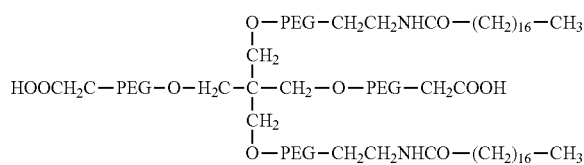

10 g of 4-arm polyethylene glycol (3,000 Da) amino-diacetic acid was dissolved in 100 mL of anhydrous methanol, placed in an ice-water bath, then 2 mL of thionyl chloride was added dropwise, the reaction was kept for 5 h at room temperature, evaporated by rotary to remove solvent, the residue was frozen for precipitation after addition of 150 mL of diethyl ether, filtered, the product was dried under vacuum to give 8.8 g of 4-arm polyethylene glycol (3,000 Da) amino-diacetic acid methyl ester.

¹H NMR (DMSO): 3.51 (m, 272H), 2.95 (m, 4H), 4.13 (s, 4H).

5 g of 4-arm polyethylene glycol (3,000 Da) amino-diacetic acid methyl ester was dissolved in 100 mL of chloroform, then 0.6 mL of triethylamine and 4.74 g of stearic acid were added, the reaction was stirred overnight at room temperature, filtered, evaporated by rotary to remove solvent, the residue obtained was dissolved by heating after addition of 100 mL of isopropanol and then frozen for precipitation, filtered, evaporated by rotary to remove solvent, the residue obtained was frozen for precipitation after addition of 100 mL of diethyl ether, filtered, the product was dried under vacuum to give 5.5 g of 4-arm polyethylene glycol (3,000 Da) stearic acid-diacetic acid methyl ester.

¹H NMR (DMSO): 0.82-0.87 (t, 6H), 3.51 (m, 272H), 4.13 (s, 4H), 7.82 (m, 2H).

To 5.0 g of 4-arm polyethylene glycol stearic acid-diacetic acid methyl ester, 50 mL of water was added, then the pH value of the system was adjusted to 12 with 0.5 mol/L of NaOH, the reaction was kept for 2 h at room temperature, filtered, the pH value was adjusted to 2-3 with 1 mol/L of hydrochloric acid, 15% NaCl was added, the reactive liquid was extracted three times with 100 mL of dichloromethane, and the organic phases were combined, washed twice with 100 mL saturated saline water with a pH value of 2-3, dried with anhydrous sodium sulfate, filtered, the filtrate was evaporated by rotary to remove solvent, the residue obtained was frozen for precipitation after addition of 100 mL of diethyl ether, filtered, the product was dried under vacuum to give 3.0 g of 4-arm polyethylene glycol (3,000 Da) stearic acid-diacetic acid.

¹H NMR (DMSO): 0.82-0.87 (t, 6H), 3.51 (m, 272H), 4.08 (s, 4H), 7.77 (m, 2H).

Example 6: Synthesis of 4-Arm Polyethylene Glycol (3,000 Da) Stearic Acid-Diacetic Acid Active NHS Ester

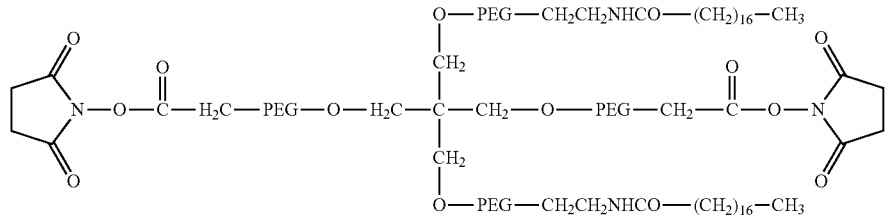

3.0 g of 4-arm polyethylene glycol (3,000 Da) stearic acid-diacetic acid was dissolved in 30 mL of dichlorometh-ane, then 0.30 g of N-hydroxysuccinimide (NHS) and 0.58 g of N, N'-dicyclohexylcarbodiimide (DCC) were added, the reaction was stirred overnight at room temperature, filtered, evaporated by rotary to remove solvent, the residue obtained was dissolved by heating after addition of 60 mL of isopropanol and then frozen for precipitation, filtered, the product was dried under vacuum to give 2.2 g of 4-arm polyethylene glycol (3,000 Da) stearic acid-diacetic acid active NHS ester.

¹H NMR (DMSO): 0.82-0.87 (t, 6H), 2.81 (s, 8H), 3.51 (m, 272H), 4.15 (s, 4H), 7.77 (m, 2H).

Example 7: Synthesis of 4-Arm Polyethylene Glycol (10,000 Da) Oleic Acid-Monoacetic Acid

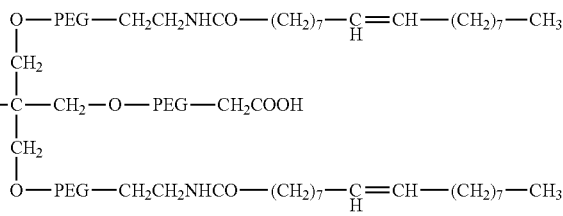

10 g of 4-arm polyethylene glycol (10,000 Da) amino-monoacetic acid methyl ester was dissolved in 120 mL of toluene, the mixture obtained was heated to remove water, then cooled to room temperature, then 0.19 mL of triethylamine was added, and 0.45 mL of oleoyl chloride was added dropwise, the reaction was stirred overnight, then evaporated by rotary to remove solvent, the residue was dissolved by heating after addition of 200 mL of isopropanol and then frozen for precipitation, filtered, the product was dried under vacuum to give 7.5 g of 4-arm polyethylene glycol (10,000 Da) oleic acid-monoacetic acid methyl ester.

¹H NMR (DMSO): 0.82-0.87 (t, 9H), 3.51 (m, 909H), 4.15 (s, 2H), 5.32 (t, 6H), 7.82 (m, 3H).

To 5.0 g of 4-arm polyethylene glycol (10,000 Da) oleic acid-monoacetic acid methyl ester, 50 mL of water was added, then the pH value of the system was adjusted to 12 with 0.5 mol/L of NaOH, the reaction was kept for 2 h at room temperature, filtered, the pH value was adjusted to 2-3 with 1 mol/L of hydrochloric acid, 15% NaCl was added, the reactive liquid was extracted three times with 100 mL of dichloromethane, and the organic phases were combined, dried with anhydrous sodium sulfate, filtered, the filtrate was evaporated by rotary to remove solvent, the residue was frozen for precipitation after addition of 100 mL of diethyl ether, filtered, the product was dried under vacuum to give 3.1 g of 4-arm polyethylene glycol (10,000 Da) oleic acid-monoacetic acid.

¹H NMR (DMSO): 0.82-0.87 (t, 9H), 3.51 (m, 909H), 4.01 (s, 2H), 5.32 (t, 6H), 7.78 (m, 3H).

Example 8: Synthesis of 4-Arm Polyethylene Glycol (10,000 Da) Oleic Acid-Monoacetic Acid Active NHS Ester

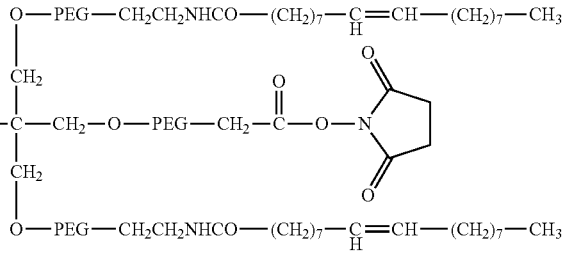

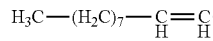

3.0 g of 4-arm polyethylene glycol (10,000 Da) oleic acid-monoacetic acid was dissolved in 30 mL of dichloromethane, then 0.90 g of N-hydroxysuccinimide (NHS) and 0.174 g of N, N'-dicyclohexylcarbodiimide (DCC) were added, the reaction was stirred overnight at room temperature, filtered, evaporated by rotary to remove solvent, the residue obtained was dissolved by heating after addition of 60 mL of isopropanol and then frozen for precipitation, filtered, the product was dried under vacuum to give 2.2 g of 4-arm polyethylene glycol (10,000 Da) oleic acid-monoacetic acid active NHS ester.

$^1$H NMR (DMSO): 0.82-0.87 (OH), 3.51 (m, 909H), 2.83 (s, 4H), 4.60 (s, 2H), 5.32 (t, 6H), 7.78 (m, 3H).

Example 9: Synthesis of 8-Arm Polyethylene Glycol (Hexamer Glycerol, 10,000 Da) Oleic Acid-Monoacetic Acid 10 g of 8-arm polyethylene glycol (hexamer glycerol, 10,000 Da) amino-monoacetic acid methyl ester was dissolved in 120 mL of toluene, the mixture obtained was heated to remove water, then cooled to room temperature, then 0.44 mL of triethylamine was added, and 1.05 mL of oleoyl chloride was added dropwise, the reaction was stirred overnight, then evaporated by rotary to remove solvent, the residue obtained was dissolved by heating after addition of 200 mL of isopropanol and then frozen for precipitation, filtered, the product was dried under vacuum to give 8.7 g of 8-arm polyethylene glycol (hexamer glycerol, 10,000 Da) oleic acid-monoacetic acid methyl ester.

$^1$H NMR (DMSO): 0.82-0.87 (t, 21H), 3.51 (m, 909H), 4.15 (s, 2H), 5.32 (t, 14H), 7.82 (m, 7H).

To 5.0 g of 8-arm polyethylene glycol (hexamer glycerol, 10,000 Da) oleic acid-monoacetic acid methyl ester, 50 mL of water was added, then the pH value of the system was adjusted to 12 with 0.5 mol/L of NaOH, the reaction was kept for 2 h at room temperature, filtered, the pH value was adjusted to 2-3 with 1 mol/L of hydrochloric acid, 15% NaCl was added, the reactive liquid was extracted three times with 100 mL of dichloromethane, and the organic phases were combined, dried with anhydrous sodium sulfate, filtered, the filtrate was evaporated by rotary to remove solvent, the residue obtained was frozen for precipitation after addition of 100 mL of diethyl ether, filtered, the product was dried under vacuum to give 3.1 g of 8-arm polyethylene glycol (hexamer glycerol, 10,000 Da) oleic acid-monoacetic acid.

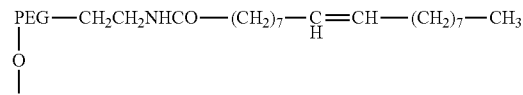

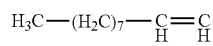

$^1$H NMR (DMSO): 0.82-0.87 (t, 21H), 3.51 (m, 909H), 4.01 (s, 2H), 5.32 (t, 14H), 7.78 (m, 7H).

Example 10: Synthesis of 8-Arm Polyethylene Glycol (Hexamer Glycerol, 10,000 Da) Oleic Acid-Monoacetic Acid Active NHS Ester

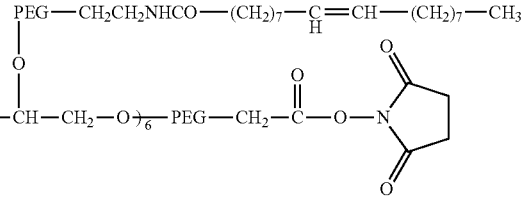

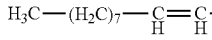

3.0 g of 8-arm polyethylene glycol (hexamer glycerol, 10,000 Da) oleic acid-monoacetic acid was dissolved in 30 mL of dichloromethane, then 0.90 g of N-hydroxysuccinimide (NHS) and 0.174 g of N, N'-dicyclohexylcarbodiimide (DCC) were added, the reaction was stirred overnight at room temperature, filtered, evaporated by rotary to remove solvent, the residue obtained was dissolved by heating after addition of 60 mL of isopropanol and then frozen for precipitation, filtered, the product was dried under vacuum to give 2.7 g of 8-arm polyethylene glycol (hexamer glycerol, 10,000 Da) oleic acid-monoacetic acid active NHS ester.

1H NMR (DMSO): 0.82-0.87 (t, 21H), 3.51 (m, 909H), 2.83 (s, 4H), 4.60 (s, 2H), 5.32 (t, 14H), 7.78 (m, 7H).

Example 11: Synthesis of 4-Arm Polyethylene Glycol (3,000 Da) Oleic Acid-Diacetic Acid To 5.0 g of 4-arm polyethylene glycol (3,000 Da) oleic acid-diacetic acid methyl ester, 50 mL of water was added, then the pH value of the system was adjusted to 12 with 0.5 mol/L of NaOH, the reaction was kept for 2 h at room temperature, filtered, the pH value was adjusted to 2-3 with 1 mol/L of hydrochloric acid, 15% NaCl was added, the reactive liquid was extracted three times with 100 mL of dichloromethane, and the organic phases were combined, dried with anhydrous sodium sulfate, filtered, the filtrate was evaporated by rotary to remove solvent, the residue was frozen for precipitation after addition of 100 mL of diethyl ether, filtered, the product was dried under vacuum to give

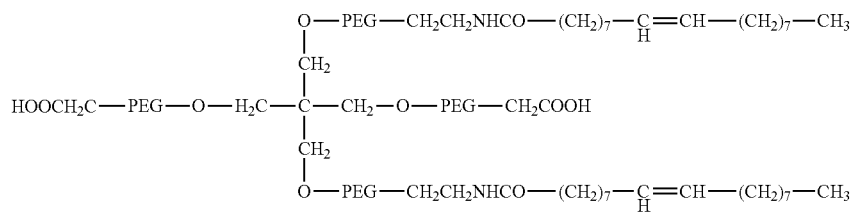

10 g of 4-arm polyethylene glycol (3,000 Da) amino-diacetic acid methyl ester was dissolved in 120 mL of toluene, the mixture obtained was heated to remove water, then cooled to room temperature, then 0.46 mL of triethylamine was added, and 1.0 mL of oleoyl chloride was added dropwise, the reaction was stirred overnight, then evaporated by rotary to remove solvent, the residue obtained was dissolved by heating after addition of 200 mL of isopropanol and then frozen for precipitation, filtered, the product was dried under vacuum to give 8.9 g of 4-arm polyethylene glycol (3,000 Da) oleic acid-diacetic acid methyl ester.

2.4 g of 4-arm polyethylene glycol (3,000 Da) oleic acid-diacetic acid.

$^1$H NMR (DMSO): 0.82-0.87 (t, 6H), 3.51 (m, 272H), 4.01 (s, 4H), 5.32 (t, 4H), 7.78 (m, 2H).

Example 12: Synthesis of 4-Arm Polyethylene Glycol (3,000 Da) Oleic Acid-Diacetic Acid Active NHS Ester

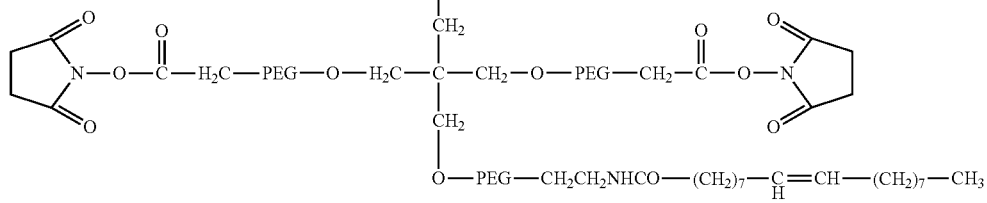

$^1$H NMR (DMSO): 0.82-0.87 (t, 6H), 3.51 (m, 272H), 4.15 (s, 4H), 5.32 (t, 4H), 7.82 (m, 2H).

2.0 g of 4-arm polyethylene glycol (3,000 Da) oleic acid-diacetic acid was dissolved in 20 mL of dichlorometh ane, then 0.20 g of NHS and 0.174 g of DCC were added, the reaction was stirred overnight at room temperature, filtered, evaporated by rotary to remove solvent, the residue obtained was dissolved by heating after addition of 60 mL of isopropanol and then frozen for precipitation, filtered, the product was dried under vacuum to give 1.6 g of 4-arm polyethylene glycol (3,000 Da) oleic acid-diacetic acid active NHS ester.

$^1$H NMR (DMSO): 0.82-0.87 (t, 6H), 3.51 (m, 272H), 2.83 (s, 8H), 4.60 (s, 4H), 5.32 (t, 4H), 7.78 (m, 2H).

The invention claimed is:

1. A multi-arm polyethylene glycol derivative, wherein the multi-arm polyethylene glycol derivative has a structure of general formula I or general formula VI

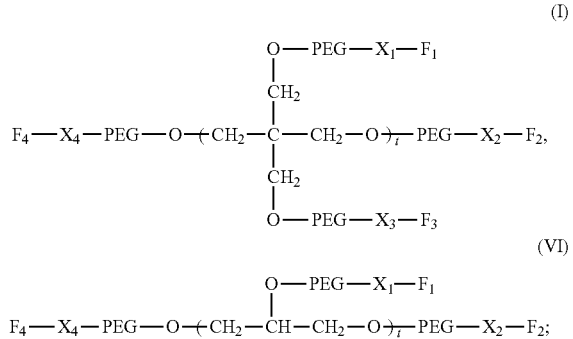

wherein:
PEG is the same or different and is —(CH$_2$CH$_2$O)$_m$—, m is an integer of 3-250;
l is an integer greater than or equal to 1 and less than or equal to 10;
X$_1$, X$_2$, X$_3$, and X$_4$ are independently selected from the group consisting of the following groups:

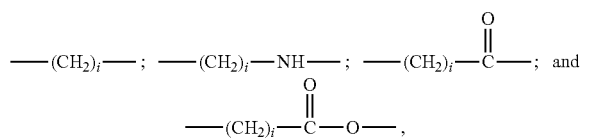

wherein i is an integer of 0-10;
F$_1$, F$_2$, F$_3$, and F$_4$ are independently selected from the group consisting of the following groups:

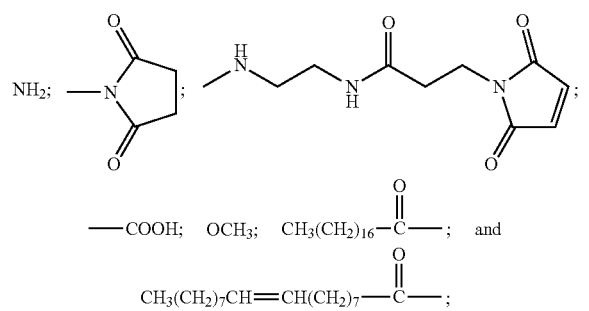

and, in general formula I at least one of F$_1$, F$_2$, F$_3$, and F$_4$ is

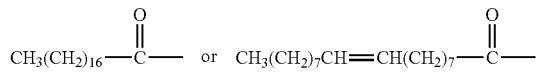

or in general formula VI at least one of F$_1$, F$_2$, and F$_4$ is

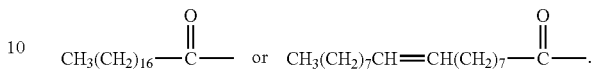

2. The multi-arm polyethylene glycol derivative according to claim 1, wherein in general formula I at least two of F$_1$, F$_2$, F$_3$, and F$_4$ are

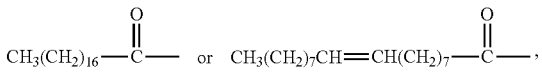

or in general formula VI at least two of F$_1$, F$_2$, and F$_4$ are

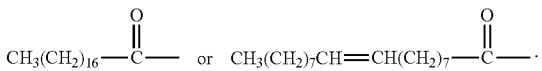

3. The multi-arm polyethylene glycol derivative according to claim 1, wherein the said F$_2$ and/or F$_4$ are —COOH or

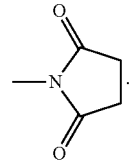

4. The multi-arm polyethylene glycol derivative according to claim 1, wherein the said X$_2$ and X$_4$ are selected from —(CH$_2$)$_i$—NH—, wherein i is an integer of 1-5.

5. The multi-arm polyethylene glycol derivative according to claim 1, wherein the said X$_2$ and X$_4$ are selected from

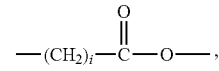

wherein i is an integer of 1-5.

6. The multi-arm polyethylene glycol derivative according to claim 1, wherein the said X$_1$ and/or X$_3$ are —(CH$_2$)$_i$—NH—, wherein i is an integer of 1-5.

7. The multi-arm polyethylene glycol derivative according to claim 1, wherein in general formula I of multi-arm polyethylene glycol derivative, at least one of F$_1$ and F$_3$ is

8. The multi-arm polyethylene glycol derivative according to claim 1, wherein in general formula I of multi-arm polyethylene glycol derivative, both F$_1$ and F$_3$ are

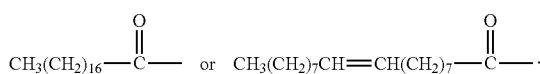

9. The multi-arm polyethylene glycol derivative according to claim 1, wherein in general formula VI of multi-arm polyethylene glycol derivative, $F_1$ is

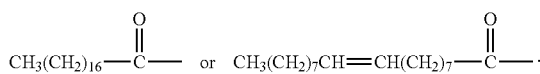

10. The multi-arm polyethylene glycol derivative according to claim 1, wherein in general formula I of multi-arm polyethylene glycol derivative, the said $F_1$ and $F_3$ are

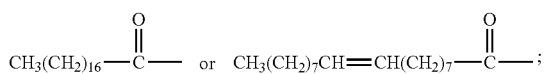

and $F_2$ and $F_4$ are —COOH or

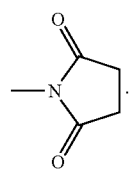

11. The multi-arm polyethylene glycol derivative according to claim 1, wherein in general formula VI of multi-arm polyethylene glycol derivative, the said $F_1$ is

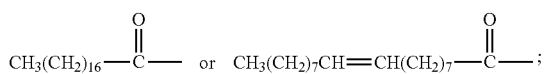

and $F_2$ and $F_4$ are —COOH or

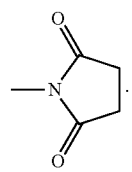

12. The multi-arm polyethylene glycol derivative according to claim 1, wherein in general formula I of multi-arm polyethylene glycol derivative, the said $F_1$, $F_2$ and $F_3$ are selected from

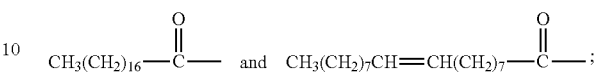

and $F_4$ is selected from —COOH and

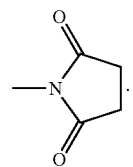

13. The multi-arm polyethylene glycol derivative according to claim 1, wherein in general formula VI of multi-arm polyethylene glycol derivative, the said $F_1$ and $F_2$ are selected from

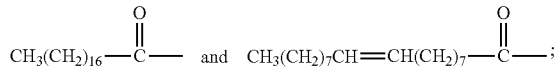

and $F_4$ is selected from —COOH and

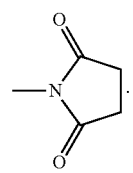

14. The multi-arm polyethylene glycol derivative according to claim 1, having a structure of general formula II-X:

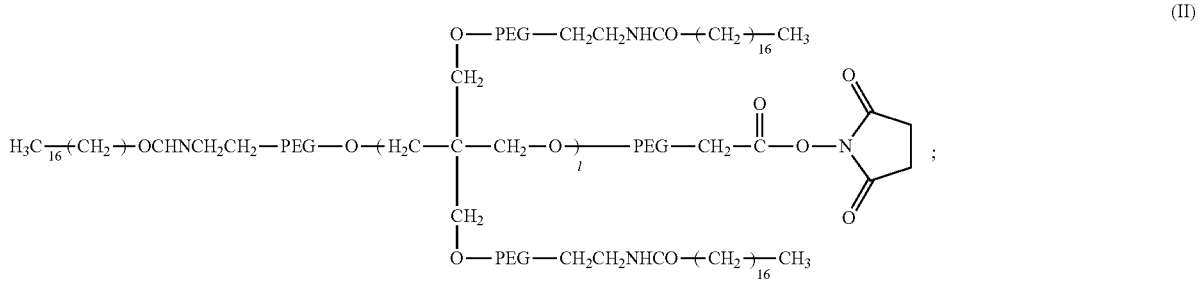

(II)

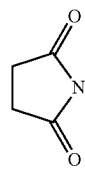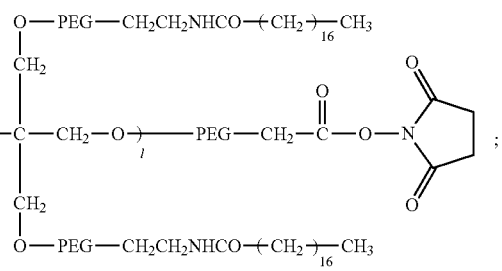 (III)
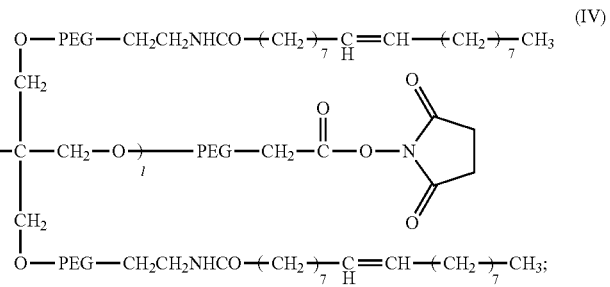 (IV)
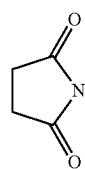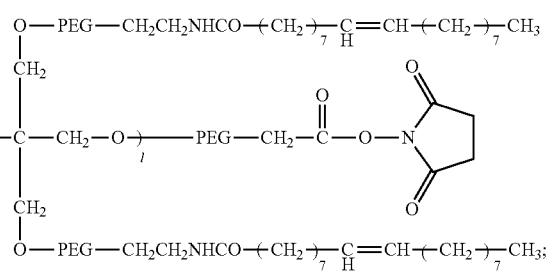 (V)
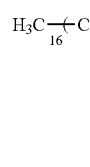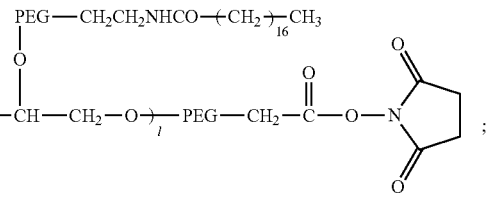 (VII)
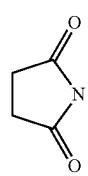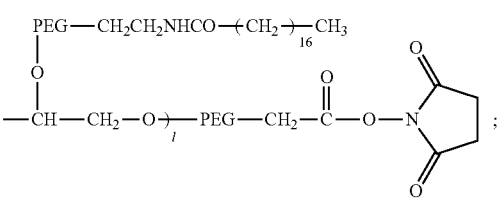 (VIII)
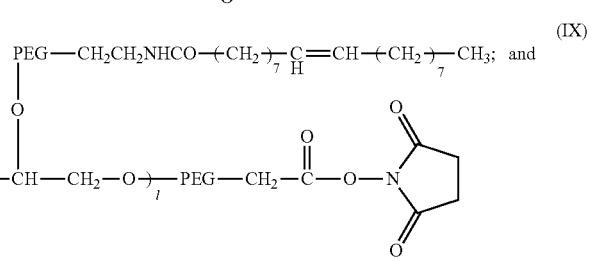 (IX)

-continued

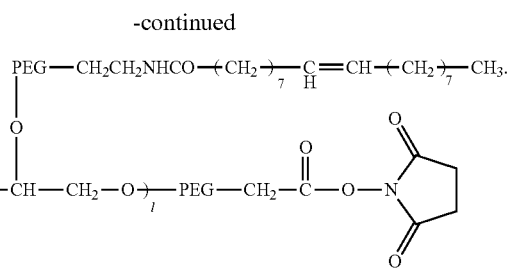

(X)

15. A method for preparation of a multi-arm polyethylene glycol derivative according to claim 1 comprising the following steps:
(1) dissolving a multi-arm polyethylene glycol amino-monoacetic acid or multi-arm polyethylene glycol amino-diacetic acid in a solvent, adding thionyl chloride and reacting for 1-10 h to give a multi-arm polyethylene glycol amino-monoacetic acid methyl ester or multi-arm polyethylene glycol amino-diacetic acid methyl ester;
(2) dissolving multi-arm polyethylene glycol amino-monoacetic acid methyl ester or multi-arm polyethylene glycol amino-diacetic acid methyl ester in a solvent, adding stearic acid and triethylamine for reaction to give a multi-arm polyethylene glycol stearic acid-monoacetic acid methyl ester or multi-arm polyethylene glycol stearic acid-diacetic acid methyl ester;
(3) to multi-arm polyethylene glycol stearic acid-monoacetic acid methyl ester or multi-arm polyethylene glycol stearic acid-diacetic acid methyl ester, adding NaOH to adjust pH value to 10-12, reacting for 1-8 h, filtering, adjusting pH value to 2-3 with hydrochloric acid, extracting, and separating to obtain a multi-arm polyethylene glycol stearic acid-monoacetic acid or multi-arm polyethylene glycol stearic acid-diacetic acid; and
optionally, (4) dissolving multi-arm polyethylene glycol stearic acid-monoacetic acid or multi-arm polyethylene glycol stearic acid-diacetic acid in a solvent, adding N-hydroxysuccinimide (NHS) and N,N'-dicyclohexylacarbodiimide for reaction to give a multi-arm polyethylene glycol stearic acid-monoacetic acid NHS ester or multi-arm polyethylene glycol stearic acid-diacetic acid NHS ester.

16. A method for preparation of a multi-arm polyethylene glycol derivative according to claim 1 comprising the following steps:
(1) dissolving a multi-arm polyethylene glycol amino-monoacetic acid or multi-arm polyethylene glycol amino-diacetic acid in a solvent, adding thionyl chloride and reacting for 1-10 h to give a multi-arm polyethylene glycol amino-monoacetic acid methyl ester or multi-arm polyethylene glycol amino-diacetic acid methyl ester;
(2) dissolving multi-arm polyethylene glycol amino-monoacetic acid methyl ester or multi-arm polyethylene glycol amino-diacetic acid methyl ester in a solvent, adding oleoyl chloride and triethylamine for reaction to give a multi-arm polyethylene glycol oleic acid-monoacetic acid methyl ester or multi-arm polyethylene glycol oleic acid-diacetic acid methyl ester;
(3) to multi-arm polyethylene glycol oleic acid-monoacetic acid methyl ester or multi-arm polyethylene glycol oleic acid-diacetic acid methyl ester, adding NaOH to adjust pH value to 10-12, reacting for 1-8 h, filtering, adjusting pH value to 2-3 by using hydrochloric acid, extracting, and separating to obtain a multi-arm polyethylene glycol oleic acid-monoacetic acid or multi-arm polyethylene glycol oleic acid-diacetic acid; and
optionally, (4) dissolving multi-arm polyethylene glycol oleic acid-monoacetic acid or multi-arm polyethylene glycol oleic acid-diacetic acid in a solvent, adding N-hydroxysuccinimide (NHS) and N,N'-dicyclohexylacarbodiimide for reaction to give a multi-arm polyethylene glycol oleic acid-monoacetic acid NHS ester or multi-arm polyethylene glycol oleic acid-diacetic acid NHS ester.

* * * * *